United States Patent [19]
Coleman et al.

[11] Patent Number: 5,860,732
[45] Date of Patent: Jan. 19, 1999

[54] LAVA LAZER LICKS CANDY HOLDING AND CONSUMPTION DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 30,926

[22] Filed: Feb. 26, 1998

[51] Int. Cl.$^6$ .................................................... F21V 33/00
[52] U.S. Cl. ............................ 362/253; 362/96; 362/186
[58] Field of Search ............................. 362/96, 109, 186, 362/253, 806

[56] References Cited

U.S. PATENT DOCUMENTS 5,165,781  11/1992  Orak ......................................... 362/186
5,676,988  10/1997  Coleman et al. .................... 362/253 X

*Primary Examiner*—Stephen F. Husar
*Attorney, Agent, or Firm*—Melvin L. Crane

[57] ABSTRACT

A novelty flashlight and liquid candy consumption device. This device includes an upper housing which is attached to an upper end of a flashlight and filled with a liquid candy. The flashlight is turned on to make the candy cylinder glow brightly while the liquid candy is being consumed. The upper housing is covered with a cap which has a perforated upper end through which the candy can be consumed. After the candy has been consumed, the device can be employed as a miniature flashlight. A battery source may be permanently sealed inside the housing and is not replaceable or may be removable. The removable cap is provided with a removable clear plastic cover which is placed over the cap and which is secured in place at one end for protection of the candy.

20 Claims, 1 Drawing Sheet

LAVA LAZER LICKS CANDY HOLDING AND CONSUMPTION DEVICE

This invention is directed to a novelty candy holding device including a flashlight in combination with a liquid or gel type candy which can be illuminated by the flashlight and consumed by the user.

BACKGROUND OF THE INVENTION

It is well known in the prior art that flashlights have been made and used in many different ways. U.S. Pat. No. 2,114,266 is directed to a small flashlight used to illuminate a key for placing the key in a lock; U.S. Pat. No. 2,696,384 is directed to a flashlight which simulates a lit cigar; U.S. Pat. No. 4,364,104 relates to a novelty light which is foldable and is opened to have the appearance of a switch-blade knife; U.S. Pat. No. 4,464,861 sets forth a plush toy which includes a face that lights up; U.S. Pat. No. 4,600,974 is directed to an optically decorated baton; U.S. Pat. No. 4,446,509 relates to a flashlight in combination with a compass which is lit for observing the compass; and U.S. Pat. No. 4,072,855 sets forth a flashlight which shines a light through a liquid mixture having a plurality of luminous platelets which reflect light from the flashlight. All of the above patents make use of a battery operated light for some specific purpose.

OBJECTS OF THE INVENTION

It is therefore an object of the invention to make use of a battery operated light to illuminate a liquid or gel candy through which the light shines and which can be consumed while illuminated or used as a novelty lighted toy when not being consumed.

Another object is to provide a flashlight connector which will support one end of a candy holder in which upon being consumed, the candy may be replaced and/or the flashlight may be used as a light without the candy attached.

Still another object is to provide a covering for the end of the container which holds the candy to prevent soiling or contaminating the holder.

Yet another object is to make an inexpensive novelty flashlight which is disposable when the battery has discharged and/or the candy has been consumed, while another object is to provide a more expensive novelty flashlight-candy device in which the candy, bulb and battery source may be replaced.

These and other objects and advantages will become obvious to those skilled in the art upon a review of the drawings and description of the drawings.

DETAILED DESCRIPTION OF THE DEVICE

Figure 1:
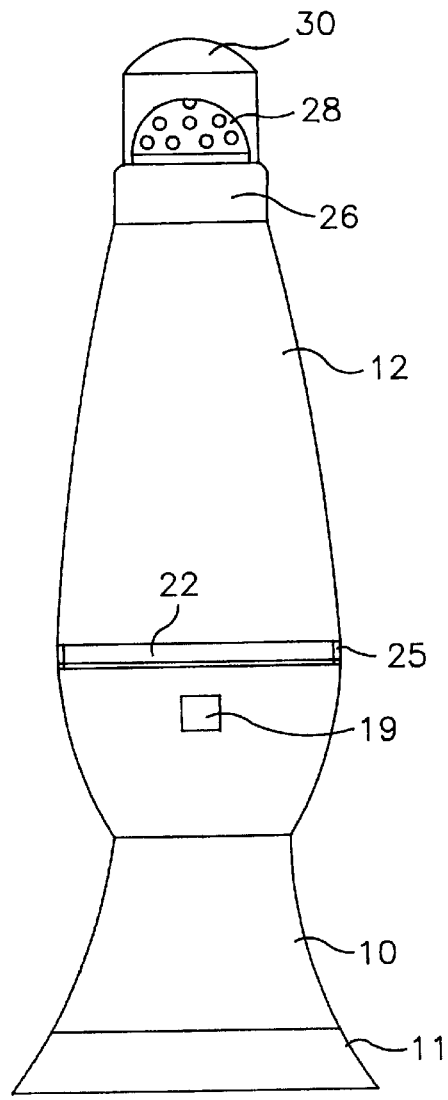
FIG. 1 is a side view of a novelty flashlight liquid candy holding device which illustrates an outer configuration of the device.

Now referring to the drawings, there is shown an inexpensive flashlight-candy device made in accordance with the invention. As shown, the flashlight includes a housing 10 having a closed removable lower end 11 and a removable closed upper end 12. The electrical circuit includes an electrical energy source 13 which may be at least one battery that supplies a current to a bulb 14 via a negative electrical conductor 15 extending from the base 16 of the bulb to the negative end of the battery source and a positive electrical conductor 17 that extends from the positive end of the battery source to the center contact 18 on the bulb via a switch 19 placed in the electrical circuit in order to control the current to the bulb. The bulb is supported in a reflector 21 having a reflective surface toward the closed upper end of the housing which reflects the light out of the open end of the flashlight housing via a lens 22. The lens 22 is clear plastic through which the light shines. The reflector and lens are held in place by the upper end of the housing which is open on each end. One end of the upper housing fits over the end of the flashlight housing 10 and has a portion 25 that rests against the lens to hold the lens and reflector in place in the housing. The lower end of housing 12 may be screw-threaded onto the upper end of housing 10 or may be slid thereon with a tight fit so the housing 12 can be removed to reach the lens reflector and bulb.

The upper end of the upper housing is provided with a screw threaded twist-off top 26 or a top that fits over the upper end of the housing 12 with a tight fit. The top 26 is provided with a semi-spherical perforated end 28 through which the liquid or gel candy substance can pass to be consumed by a consumer. A plastic pop-off cover 30 fits over the perforated end 28 and is held in place by any suitable means such as a tight fit about the base of the semi-spherical perforated end 28. The plastic pop-off cover protects the perforated end from dirt, etc. when not in use by a consumer.

The lower end housing 11 is removable so that the batteries can be replaced or in case the batteries are not to be replaced the lower housing can be permanently secured to the flashlight housing. The upper end 12 can be secured to the upper end of the flashlight housing 10 to be removed for changing the bulb or it may be permanently affixed to the flashlight housing for a throw-away type.

The flashlight is assembled and provided with the batteries, reflector, bulb, switch and lower end housing 11. The upper end housing 12 is assembled in place onto the flashlight housing with the lens 22 in place. The fit between the lens, the upper end housing 12 and the flashlight housing should be a tight fit to prevent any candy substance from leaking into the flashlight bulb area. Once the flashlight lower and upper housings have been assembled, the twist-off cap is removed and the liquid candy or gel is filled into the upper housing. Once the candy substance has been added to the upper housing 12, the top 26 is fitted into place and the protective pop-off cover is added to the top. The flashlight-candy device is now ready for use. One can play with the device by shining the light through the liquid candy. The liquid candy can be a single color or multicolor so that different colored light will shine from the candy. Small flakes of different colored hard candy could be added to the liquid so that the light could reflect off the hard candy flakes, if one desires to add the hard candy flakes.

Depending on the expense of manufacture of the device, the housing parts could be threaded together and the candy could be dispensed by a roller-ball type dispenser or by the perforations previously set forth. The manner in which the candy is removed from the upper housing 12 is immaterial so long as it can be easily removed through an end by the consumer. Once the consumer has consumed a sufficient amount, the protective cap can be replaced in order to protect the end through which the liquid candy passes. Further, once the liquid candy has been dispensed, the twist-off cap can be removed and additional candy liquid can be added to the upper housing 12.

Figure 2:
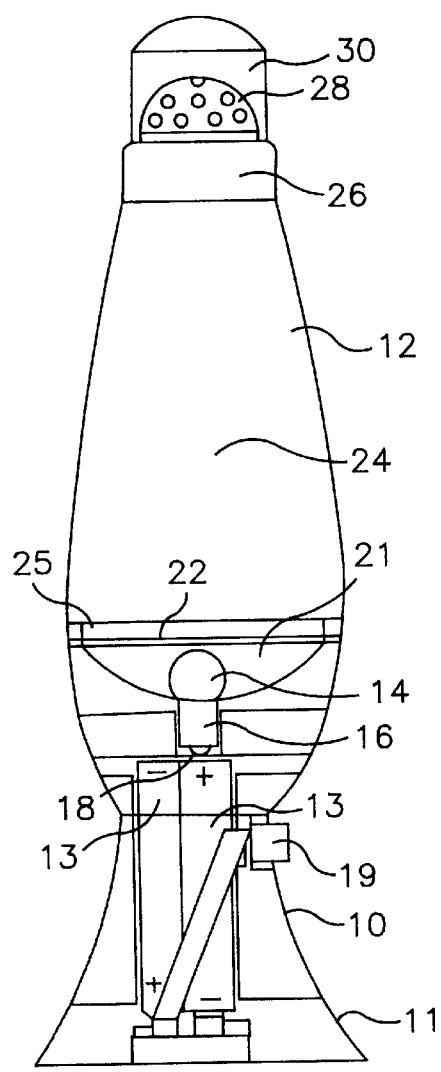
FIG. 2 is a detail of a plastic type of flashlight-candy device which illustrates the various parts.
Figure 3:
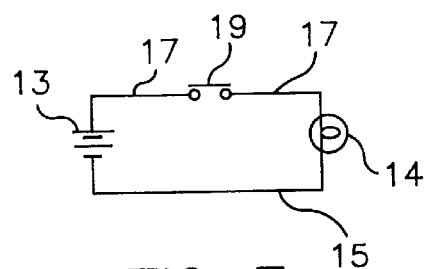
FIG. 3 illustrates a simple electrical circuit for the flashlight.

FIG. 3 illustrates an electrical circuit for operation of the flashlight. As shown, an electrical conductor 15 is secured to the negative end of two batteries in series and to a base of the bulb 14. Electrical conductors connect the positive end of the batteries on one side of the switch 19 and from the opposite side of the switch a connector connects with the positive end of the bulb. The flashlight housing may be made of any durable material which may be formed or molded into any desired shape such as cylindrical. Since the device is to be used by children, it should have no sharp features. It should be of a so-called non-breakage material and non-toxic. The device is shown with two small batteries. Any number of batteries and any desired size battery may be used. However, if the device is to be made so that the batteries are not replaceable, the batteries should be as inexpensive as possible for operation over a useful period of time. The switch may be a slide switch, a push on-off switch, or a contact switch which only completes the circuit while being pushed to make contact with a circuit completing contact. If a switch of the latter type is used, a user such as a small child will not leave the light on while not being held or in use. If the device as shown in FIGS. 1 and 2 is of a disposable type with non-replaceable batteries, the upper housing 12 can be permanently affixed to the flashlight housing by any suitable means such as epoxy or any adhesive.

The foregoing relates to preferred exemplary embodiments of the invention, it being understood that other variants and embodiments thereof are possible within the spirit and scope of the invention, the latter being defined by the appended claims.

We claim:

1. A novelty flashlight and liquid candy consumption device which comprises:
    a flashlight housing,
    an electrical source in said flashlight housing,
    a light bulb and reflector in and near an open end of said flashlight housing,
    a lens secured over said bulb and reflector,
    an electrical circuitry including said electrical source for operation said light bulb,
    a switch means in said electrical circuitry for controlling current to said bulb,
    an upper housing secured on an open end of said flashlight housing juxtaposed said bulb and reflector for receiving a light conducting liquid candy or gel-type candy therein, whereby light from said light bulb may be conducted through said light conducting liquid candy by operation of said switch means.

2. A novelty flashlight and liquid candy consumption device as set forth in claim 1, wherein:
    said upper housing is closed on an upper end by a removable top, said removable top includes means by which a liquid candy can be dispensed from said removable top.

3. A novelty flashlight and liquid candy consumption device as set forth in claim 1, in which:
    said upper housing contains a liquid candy or gel-type candy therein.

4. A novelty flashlight and liquid candy consumption device as set forth in claim 3, which includes:
    a removable protective covering on said removable top.

5. A novelty flashlight as set forth in claim 4, in which:
    said removable top has an upper perforated end through which said liquid candy passes for consumption, said covering is closed on one end for covering said perforated end of said removable top and includes an open end which is secured to said removable top.

6. A novelty flashlight and liquid candy consumption device as set forth in claim 1, in which the lower housing and upper housing are removable from said flashlight housing.

7. A novelty flashlight and liquid candy consumption device as set forth in claim 2, in which the lower housing and upper housing are removable from said flashlight housing.

8. A novelty flashlight and liquid candy consumption device as set forth in claim 3, in which the lower housing and upper housing are removable from said flashlight housing.

9. A novelty flashlight and liquid candy consumption device as set forth in claim 4, in which the lower housing and upper housing are removable from said flashlight housing.

10. A novelty flashlight and liquid candy consumption device as set forth in claim 5, in which the lower housing and upper housing are removable from said flashlight housing.

11. A novelty flashlight and liquid candy consumption device as set forth in claim 6, in which:
    said upper and lower housings include screw threads which attach said upper and lower housings onto said flashlight housing.

12. A novelty flashlight and liquid candy consumption device as set forth in claim 7, in which:
    said upper and lower housings include screw threads which attach said upper and lower housings onto said flashlight housing.

13. A novelty flashlight and liquid candy consumption device as set forth in claim 8, in which:
    said upper and lower housings include screw threads which attach said upper and lower housings onto said flashlight housing.

14. A novelty flashlight and liquid candy consumption device as set forth in claim 9, in which:
    said upper and lower housings include screw threads which attach said upper and lower housings onto said flashlight housing.

15. A novelty flashlight and liquid candy consumption device as set forth in claim 10, in which:
    said upper and lower housings include screw threads which attach said upper and lower housings onto said flashlight housing.

16. A novelty flashlight and liquid candy consumption device as set forth in claim 11, in which:
    said twist-off cap includes screw threads on said open end, and
    said upper end of said upper housing includes screw threads which match said screw threads on said twist-off cap.

17. A novelty flashlight and liquid candy consumption device as set forth in claim 12, in which:
    said twist-off cap includes screw threads on said open end, and
    said upper end of said upper housing includes screw threads which match said screw threads on said twist-off cap.

18. A novelty flashlight and liquid candy consumption device as set forth in claim 13, in which:

said twist-off cap includes screw threads on said open end, and said upper end of said upper housing includes screw threads which match said screw threads on said twist-off cap.

19. A novelty flashlight and liquid candy consumption device as set forth in claim 14, in which:

said twist-off cap includes screw threads on said open end, and said upper end of said upper housing includes screw threads which match said screw threads on said twist-off cap.

20. A novelty flashlight and liquid candy consumption device as set forth in claim 15, in which:

said twist-off cap includes screw threads on said open end, and said upper end of said upper housing includes screw threads which match said screw threads on said twist-off cap.

\* \* \* \* \*